Figure 1:
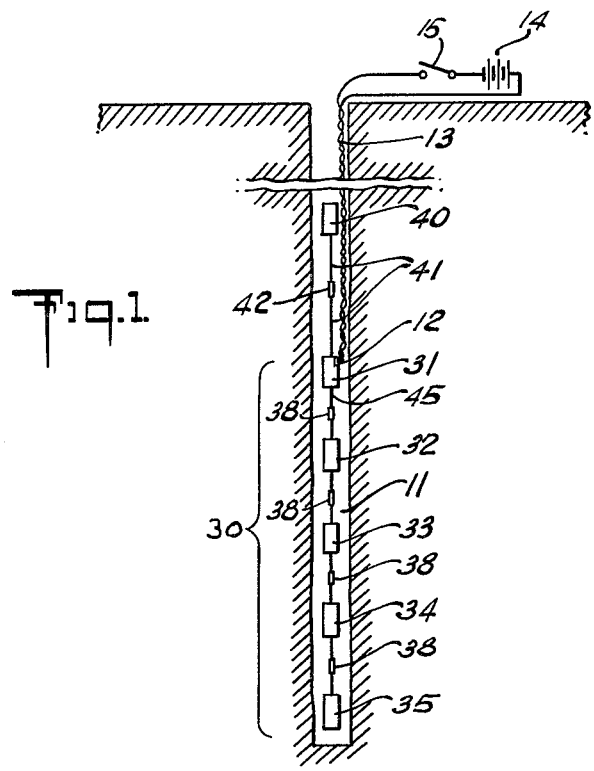

3,050,149
METHOD FOR SEISMIC PROSPECTING
Oswald A. Itria and Alvin L. Parrack, Bellaire, Tex., assignors to Texaco Inc., a corporation of Delaware
Filed Sept. 26, 1957, Ser. No. 686,386
1 Claim. (Cl. 181—.5)

This invention is concerned with seismic prospecting, and more specifically, with a method and apparatus for improving the effects of a high explosive detonation in a shot hole.

Whereas much consideration has been given, followed by many variations in technique, in connection with firing high explosive charges in order to generate seismic energy for the purpose of making exploratory probings, this has been done for various reasons, such as to provide advance information in connection with various mineral products. The most common system employed in detonating a high explosive for such seismic exploration has been that employing a charge of dynamite, or the like, located below the surface of the earth in a shot hole. Furthermore, it is the most common practice to tamp the charge thus detonated by covering the same with water, or sometimes sand or the like.

When the charge is detonated, whether it comprises one single charge or a plurality of separate charges, the effect of the detonation is to create a small geyser which blows out of the top of the shot hole in which the charge is located. Such geyser, or shot hole blow, has been accepted as a necessary evil without much consideration having been given thereto, while various technique have been developed in attempting to improve the quality of the seismic energy generated. This invention, however, is concerned with providing a technique for controlling the shot hole blow thus created, and in this manner to improve the quality of the seismic energy generated by reducing undesirable and interference type energy which is generated and/or flows from the inevitable shot hole blow that accompanies a charge detonation.

Consequently, it is an object of this invention to provide a method and apparatus for controlling the shot hole blow which accompanies a seismic high explosive detonation by providing for the detonation of a secondary, or bucking charge that is located above the principal charge and that is detonated at a delayed time following detonation of the principal charge.

Another object of this invention is to provide a method and apparatus for controlling shot hole blow from a principal charge detonation, no matter whether the principal charge takes the form of a plurality of individual charges (whether detonated simultaneously or in sequence) or whether the principal charge constitutes a single relatively strong high explosive detonation.

Briefly the invention concerns seismic prospecting and deals with a method of improving the effect of high explosive charge detonation in a shot hole. Such method comprises the steps of placing a principal charge at a predetermined depth below the surface of the earth in said shot hole, and placing a bucking charge spaced above said principal charge in said hole. The method also comprises the steps of detonating said principal charge, and detonating said bucking charge after a predetermined time delay following the detonation of said principal charge.

The invention also may be briefly described as a combination for use in seismic prospecting. The combination being one with a shot hole, and comprises first high explosive means for creating a principal high energy short time duration slug of seismic waves at a predetermined location in said shot hole. The combination also comprises second high explosive means located spaced above said first explosive means in said hole, for creating a bucking charge to control said shot hole blow, as well as means for detonating said first high explosive means, and means for detonating said second explosive means at a predetermined time after the detonation of said first explosive means.

Figure 2:
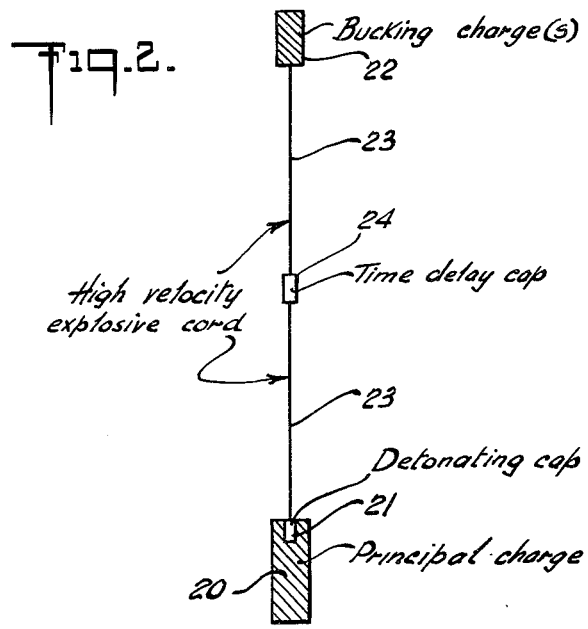

The above and other objects and benefits of the invention will appear in more detail hereafter in connection with the description that is set forth below and that is illustrated in the drawings wherein:

FIG. 1 is a schematic cross-sectional view of a seismic shot hole, illustrating a principal charge array and a bucking charge located spaced somewhat above such array; and FIG. 2 is a schematic diagram with captions indicating the basic concept of the invention.

Referring to FIG. 1 in a general manner first, it is pointed out that in seismic exploration (as most commonly carried out) there is employed a shot hole 11 that is drilled in the earth for a convenient depth depending upon the formations encountered while drilling, as well as the type and magnitude of charge that is to be detonated therein. The usual manner of detonating a charge for such exploratory operations includes the use of an electrical detonating cap 12 that is connected to the surface, for controlling detonation thereof, by means of a pair of electrically conducting wires 13 which are connected in an electrical circuit including a source of E.M.F. such as a battery 14, illustrated, and a switch 15 for energizing the cap at the desired time for detonating the principal charge.

When the charge is detonated (in a very high percentage of the cases) a geyser of the water or sand or other material which has been used to tamp the charge, is created, vertically upward out of the top of the shot hole 11. Such geyser is caused by the expansion of the gases created upon detonation of the charge. Thus, it is only a very short period of time following the detonation of the charge before the geyser, or shot hole blow that is thus created, takes place. Now particularly in reflection seismic exploration work, this shot hole blow occurs during the time within which recorded information that is valuable, is being received. Therefore, the undesirable effects of this shot hole blow will be apparent and will cause unwanted disturbance during the making of a seismic record. Furthermore, it has been discovered that if this shot hole blow is controlled in accordance with this invention, the seismic energy created is of an improved quality in that a higher percentage of the energy from the explosion is converted into useful seismic waves.

Referring to FIG. 2, the broad concept of this invention may be readily described by pointing out that there is shown a principal charge 20 which has imbedded therein a detonating cap 21 and which is connected to a bucking charge 22 by means of a relatively small diameter high explosive cord 23 such as the commonly employed high velocity explosive cord called Primacord as a trade name. In addition, there is located somewhere along the length of high velocity explosive cord 23, a time delay cap 24.

Now, the action of the arrangement thus illustrated in FIG. 2 will be apparent. It will consist of the detonation of the principal charge 20 (as set off by the detonating cap 21) which will be followed by the detonation of the bucking charge 22 after a predetermined time delay, as determined by the time delay cap 24. Delay cap 24 is a commercially available article that delays the transmission of an explosive detonation for a given period of time.

Consequently, the principal charge 20 will detonate, and generate seismic energy, while at the same time the expanding gases caused by such detonation will create an upward pressure in the shot hole. Such pressure then causes the above described shot hole blow. Now, by regulating the time delay between the detonation of the principal charge and detonation of the bucking charge 22, the expanding gases pushing upward in the shot hole will be trapped and counteracted by the secondary expanding gases generated when the bucking charge 22 is detonated. When this delay time has been set a desired amount, the control of the shot hole blow will be optimum, and the seismic energy created by the principal charge will have a greatly improved character.

It is pointed out that while the basic diagram of FIG. 2 only shows a single principal charge and a single bucking charge, it will be clear to anyone skilled in the art that the principal charge might consist of a plurality of separate charges, and likewise the bucking charge might take the form of more than one individual charge of high explosive. Furthermore, it is pointed out that in the usual situation, the bucking charge will be of a substantially lesser magnitude than the principal charge for any given charge detonation, but this is not necessarily true in all cases.

It is also to be noted that whereas the illustrations show only the use of an electrical detonating cap for the principal charge, with time delay caps acting as the means for delaying detonation of the bucking charge; these are only illustrations of one manner for carrying the detonation of the charges. Many other ways of detonating these charges with the required time delay, might be employed, e.g., separate detonating caps might be used in the principal charge and in the bucking charge, with a time delay arrangement provided for firing the caps in the desired sequence with the desired time delay between detonations.

Referring to FIG. 1 again, it is pointed out that the specifically illustrated charge array that is employed here, is one wherein there is a principal charge 30 made up of a plurality of individual charges 31, 32, 33, 34 and 35 which constitute the separate spaced charges that are employed in sequential firing (for improving the generation of seismic energy traveling in a given direction along the plurality of spaced charges). Thus in this case, there are five separate charges 31 through 35 that are spaced vertically apart in the shot hole 11 and that have a delay cap 38 located between each of the charges so that the desired sequence of firing of the individual charges will take place with the times of detonation being equal to the seismic velocity in the formation surrounding shot hole 11. This is a well known technique and no further explanation thereof need be given. Located spaced above the principal charge array 30, there is a bucking charge 40 which is connected to the upper charge 31 of the principal array 30, by means of a high velocity explosive cord 41, wherein is inserted a time delay cap 42.

The operation of the specific charge arrangement illustrated in FIG. 1, may be briefly described as follows: at the desired time for detonating the principal seismic energy generating charge 30, switch 15 will be closed. This will explode the electrical cap 12 which in turn will detonate the high explosive charge 31. Detonation of charge 31 will be carried, or transmitted, in both directions. Thus it will be transmitted upward by the explosive cord 41, and downward by a similar explosive cord 45 until the delay caps 38 and 42 are reached. Then since delay cap 38 will usually be of a short time duration, i.e., in the order of one or two milliseconds, the detonation will be soon transmitted into the next of the principal charge array which is charge 32. Traveling on down, the same action will take place with charges 33, 34 and 35, in sequence and at times such that the seismic waves generated will be reinforced by reason of the detonation of each individual charge in the principal charge array (as the seismic energy travels downward through the formation surrounding shot hole 11).

At the same time, delay cap 42 will be delaying the transmission of the explosive detonation for a relatively longer period so that the bucking charge 40 will be detonated after considerable delay following the first detonation of the entire principal charge array 30. This will therefore provide the counteracting forces of an explosion located farther up the shot hole 11, to oppose the upward pressure of the expanding gases created by explosion of the individual charges of the principal charge array 30. Consequently, the shot hole blow will be strongly controlled and a greatly improved output of useful seismic energy will be had.

A specific example of the firing of a principal charge with a delayed bucking charge thereabove, in accordance with this invention, may be described in connection with FIG. 1. Thus, one specific sequential detonation of this type included a principal charge array having five individual charges (such as charges 31–35) that were of a strength of one pound of high explosive, each. In addition, the bucking charge (such as charge 40 illustrated) was a one pound charge of the same high explosive as the individual charges of the principal charge array. The spacing between individual charges 31 through 35 and the time delay of the time delay caps 38, was adjusted for the particular formation surrounding the shot hole employed, and the bucking charge 40 was spaced twenty feet above the uppermost charge 31 with a delay cap 42 that provided ten milliseconds delay time. Clearly, the foregoing is merely one specific example of the spacing and delay time employed in carrying out this invention. Thus, it will be appreciated by anyone skilled in the art that numerous variations may be employed, such as the use of longer or shorter time delays in connection with the detonation of the bucking charge or different spacings above the principal charge, and still the improved results according to this invention, may be obtained.

While certain embodiments of the invention have been described in considerable detail in accordance with the applicable statutes, this is not to be taken as in any way limiting the invention but merely as being descriptive thereof.

It is claimed:

In seismic prospecting the method of improving the effects of high explosive charge detonation in a shot hole, comprising the steps of placing a plurality of principal charges spaced vertically from one another at predetermined depths in said shot hole, placing a bucking charge having substantially reduced strength relative to the total strength of said principal charges and spaced vertically above the uppermost of said principal charges in the shot hole, detonating said principal charges in sequence commencing with the uppermost charge, controlling the time between charges such that the sequential detonations take place at a velocity equal to the seismic velocity in the formation surrounding the shot hole, and detonating said bucking charge at a delay time after the uppermost principal charge detonation substantially greater than the time between the principal charge detonations in order to reduce hole blow and improve useful seismic energy.

References Cited in the file of this patent
UNITED STATES PATENTS

| | | |
|---|---|---|
| 87,372 | Shaffner | Mar. 2, 1869 |
| 770,459 | Frye | Sept. 20, 1904 |
| 2,384,851 | Reichert | Sept. 18, 1945 |
| 2,556,299 | Scott | June 12, 1951 |